(12) United States Patent
Farrell

(10) Patent No.: US 10,675,129 B2
(45) Date of Patent: Jun. 9, 2020

(54) SYSTEM FOR DISPENSING DENTAL COMPOSITIONS

(71) Applicant: KONINKLIJKE PHILIPS N.V., Eindhoven (NL)

(72) Inventor: Nathan Farrell, Kirkland, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/339,070

(22) PCT Filed: Jul. 12, 2018

(86) PCT No.: PCT/EP2018/068941
§ 371 (c)(1),
(2) Date: Apr. 3, 2019

(87) PCT Pub. No.: WO2019/016065
PCT Pub. Date: Jan. 24, 2019

(65) Prior Publication Data
US 2019/0365512 A1 Dec. 5, 2019

Related U.S. Application Data

(60) Provisional application No. 62/533,817, filed on Jul. 18, 2017.

(51) Int. Cl.
A61C 9/00 (2006.01)
A61C 1/08 (2006.01)
A61C 19/06 (2006.01)

(52) U.S. Cl.
CPC ............ *A61C 9/0006* (2013.01); *A61C 1/087* (2013.01); *A61C 19/066* (2013.01); *A61C 9/0026* (2013.01)

(58) Field of Classification Search
CPC ....... A61C 9/0006; A61C 9/0026; A61C 9/00; A61C 5/62; A61C 5/64; A61C 19/066;
(Continued)

(56) References Cited

U.S. PATENT DOCUMENTS 767,553 A 8/1904 Edgelow
3,060,935 A 10/1962 Riddell
(Continued)

FOREIGN PATENT DOCUMENTS

CA 2747135 C 5/2014
CN 102632013 A 8/2012
(Continued)

*Primary Examiner* — Sean M Michalski
*Assistant Examiner* — Shannel N Wright

(57) ABSTRACT

A dispensing system (10) configured to dispense a dental composition, the dispensing system including: (i) a dental tray (14) comprising a tray reservoir (18) configured to receive a dental composition (26), and further comprising a guide rail (22); (ii) a dental composition reservoir (12) for containing at least one dental composition; and (iii) a dispensing mechanism (16) in communication with the guide rail and configured to expel the dental composition from the dental composition reservoir in response to the dispensing mechanism moving along the guide rail, the dispensing mechanism comprising a nozzle (24) configured to direct the dispensed dental composition into the tray reservoir.

15 Claims, 5 Drawing Sheets

(58) Field of Classification Search
CPC .......... A61C 19/063; B65B 1/04; B65B 1/30; B65B 3/26; B67C 3/2637
USPC ...... 433/36, 214, 37, 90; 141/232, 233, 284, 141/363, 365, 383
See application file for complete search history.

(56) References Cited

U.S. PATENT DOCUMENTS

| | | | |
|---|---|---|---|
| 3,234,942 A | | 2/1966 | Simor |
| 3,380,446 A | | 4/1968 | Martin |
| 4,378,211 A | * | 3/1983 | Lococo ................ A61C 9/0006 433/36 |
| 4,382,785 A | * | 5/1983 | Lococo ................ A61C 9/0006 433/36 |
| 4,434,823 A | * | 3/1984 | Hudspith ................ A61J 1/20 137/636.1 |
| 4,560,351 A | | 12/1985 | Osborne |
| 5,211,559 A | | 5/1993 | Hart et al. |
| 5,370,533 A | * | 12/1994 | Bushnell ............ A61C 9/0006 433/214 |
| 6,676,408 B1 | * | 1/2004 | Bushnell ............ A61C 9/0006 222/638 |
| 8,402,619 B2 | * | 3/2013 | Arcand .................... F23G 5/02 110/194 |
| 10,350,038 B1 | * | 7/2019 | Sampson ................ A61C 9/00 |
| 2006/0141416 A1 | * | 6/2006 | Knutson ............ A61C 9/0006 433/37 |

FOREIGN PATENT DOCUMENTS

| | | |
|---|---|---|
| WO | 2015104683 A2 | 7/2015 |
| WO | 2016123110 A1 | 8/2016 |
| WO | 2017030576 A1 | 2/2017 |

\* cited by examiner

SYSTEM FOR DISPENSING DENTAL COMPOSITIONS

CROSS-REFERENCE TO PRIOR APPLICATIONS

This application is the U.S. National Phase application under 35 U.S.C. § 371 of International Application No. PCT/EP2018/068941, filed on Jul. 12, 2018, which claims the benefit of U.S. Provisional Patent Application No. 62/533,817 filed on Jul. 18, 2017. These applications are hereby incorporated by reference herein.

FIELD OF THE INVENTION

The present disclosure is directed generally to a system for dispensing dental compositions into a dental tray.

BACKGROUND

Dental trays are used to apply a chemical or composition to an individual's teeth and/or gums. The tray or trays are typically made of plastic, and are sized to fit over the user's upper and/or lower teeth. Some dental trays are one-size-fits-all, while other trays are customized to fit a specific user's teeth and mouth. The tray may include a reservoir where a treatment compound is dispensed.

To perform a treatment, either a dental professional or a user dispenses the chemical or composition into the reservoir of the tray. The compound is dispensed manually using a syringe or by otherwise squeezing it into the tray. The dental professional or user then places the tray over the teeth, where they are generally held in place by the gel or liquid composition. The tray is then worn for a predetermined period of time, such as overnight or for several days, as the chemical or composition is allowed to penetrate the teeth and/or gums. In addition to tooth whitening compositions, dental trays are utilized to apply chemicals or compositions that assist with sensitivity, plaque growth inhibition, and other tooth- and gum-related ailments.

Traditional dental tray methods, however, present several problems for the dental professional or the user. The trays have poor ergonomics, and thus a user must hold the tray while simultaneously depressing the plunger and positioning the syringe tip. If the tray is placed on a surface, it can move during application of the compound. There is also poor control over where the compound is dispensed, since the dental professional or user is manually positioning the syringe or tube. And there is poor control over the quantity of the compound dispensed by the dental professional or the user. Application of the compound into the reservoir of the tray requires that the user carefully control compression of the syringe plunger or squeezing of a dispensing tube. Additionally, the user must ensure that a sufficient amount—neither too little nor too much—is dispensed into the reservoir.

Accordingly, there is a continued need for systems that precisely and evenly dispense dental compositions into a dental tray.

SUMMARY OF THE INVENTION

The present disclosure is directed to inventive methods and systems for dispensing dental compositions into a dental tray. Various embodiments and implementations herein are directed to a mechanically-driven dispensing unit. The dispensing unit dispenses the dental composition into a complementary receiving tray which is configured to interact with and guide the dispensing unit such that the dental composition is dispensed into the reservoir of the receiving tray in a single ergonomic motion. Using the mechanically-driven dispensing unit and the complementary receiving tray, the dental composition is more evenly and precisely dispensed into the reservoir and is ready for application to the teeth and/or gums by the user.

Generally in one aspect, a dispensing system configured to dispense a dental composition is provided. The dispensing system includes: (i) a dental tray comprising a tray reservoir configured to receive a dental composition, and further comprising a guide rail; (ii) a dental composition reservoir comprising a dental composition; and (iii) a dispensing mechanism in communication with the guide rail and configured to expel the dental composition from the dental composition reservoir in response to the dispensing mechanism moving along the guide rail, the dispensing mechanism comprising one or more nozzles configured to direct the dispensed dental composition into the tray reservoir.

According to an embodiment, the dispensing mechanism comprises a gear, and wherein the guide rail comprises a plurality of teeth configured to guide the gear along the guide rail. According to an embodiment, the turning of the gear as the dispensing system moves along the guide rail causes the dental composition to be expelled from the dental composition reservoir. According to an embodiment, at least some of the plurality of teeth are recessed within the guide rail.

According to an embodiment, the guide rail comprises a plurality of notches configured to guide the dispensing mechanism along the guide rail.

According to an embodiment, the dental composition reservoir is configured to be refillable with the dental composition.

According to an embodiment, the dental composition reservoir is configured to be replaceable when the dental composition reservoir is empty.

According to an embodiment, the dispensing mechanism comprises a displacement pump. According to an embodiment, the displacement pump is a peristaltic-type positive displacement pump. According to an embodiment, the displacement pump is a screw pump or a rotary pump.

According to an aspect is a dispensing device configured to dispense a dental composition. The dispensing device comprises: (i) a dental tray comprising a tray reservoir configured to receive a dental composition, and further comprising a guide rail comprising a plurality of teeth; (ii) a dental composition reservoir comprising a dental composition; and (iii) a dispensing mechanism comprising a displacement pump, and further comprising a gear configured to interact with the teeth of the guide rail, wherein turning of the gear as the dispensing system moves along the guide rail causes the displacement pump to expel the dental composition from the dental composition reservoir, the dispensing mechanism comprising a nozzle configured to direct the dispensed dental composition into the tray reservoir.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a mechanically-driven dispensing unit and a complementary receiving tray for applying a dental composition to a user's teeth and/or gums. More generally, Applicant has recognized and appreciated that it would be beneficial to provide a system that more precisely and evenly dispenses a dental composition into a dental tray, thereby improving application of the treatment compound. The dispensing unit dispenses the dental composition into a complementary receiving tray which is configured to interact with and guide the dispensing unit. Using the mechanically-driven dispensing unit and the complementary receiving tray, the dental composition is more evenly and precisely dispensed into the reservoir.

A particular goal of utilization of the embodiments and implementations herein is to apply a teeth whitening composition to a user's teeth using a dental tray, although the system and method may be utilized to apply many other compounds, chemicals, and compositions to a user's teeth and/or gums.

Figure 1:
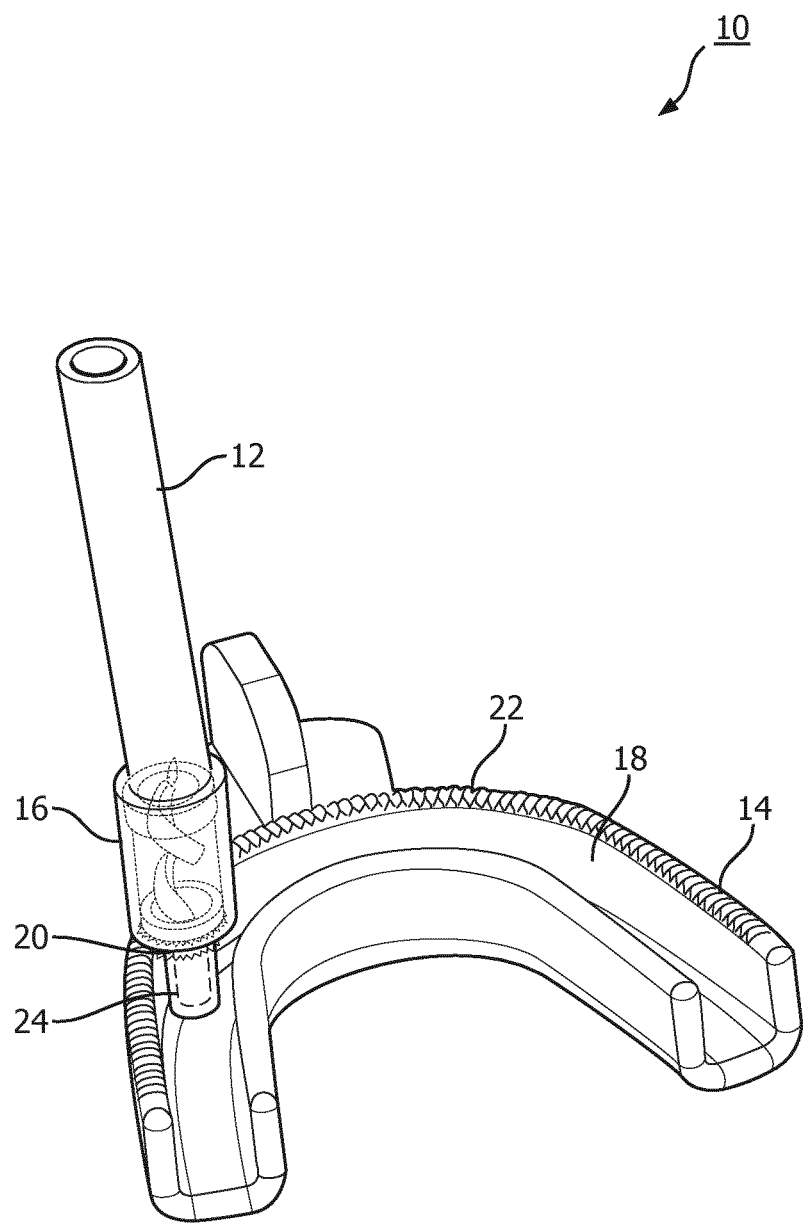
FIG. 1 is a schematic representation of a dental composition dispensing system, in accordance with an embodiment.

Referring to FIG. 1, in one embodiment, is a dispensing system 10 configured to dispense a dental composition. The dispensing system comprises a composition reservoir 12, a dispensing mechanism 16, and a tray 14. The composition reservoir stores at least one dental composition that will be dispensed into the tray 14. The composition can be any composition, such as one intended to be applied to the teeth and/or gums. For example, the composition may be a whitening composition, an antibiotic composition, a cleaning composition, and/or any other type of composition. The composition may be a single-part composition, or may be a multipart composition that is mixed before or during dispensing.

According to an embodiment, dispensing system 10 is disposable, and thus is intended for a single use or for multiple uses until composition reservoir 12 is depleted.

According to another embodiment, dispensing system 10 is reusable, and composition reservoir 12 is replaceable and/or refillable. For example, the dispensing mechanism 16 and a tray 14 may be utilized with composition reservoirs 12 that can be inserted into and removed from the dispensing mechanism 16. Thus, the composition reservoir 12 can be replaced when it is emptied, or can be refilled by the user or a dental professional. The user can purchase or otherwise obtain replacement composition reservoirs, and/or can purchase or otherwise obtain an amount of dental composition or compositions that can be utilized to refill the reservoir.

According to an embodiment, composition reservoir 12 may be configured to maintain the contents of the reservoir under pressure. For example, the composition reservoir may be pressurized or otherwise applying a force to the dental composition with which to promote dispensing of the composition. According to an embodiment, dispensing mechanism 16 comprises a valve that opens when the composition reservoir 12 moves along the tray as the dispensing mechanism 16 interacts with the guide rail. When the valve opens, the pressurized contents of the composition reservoir are dispensed into the tray.

Tray 14 comprises a tray reservoir 18 configured to receive the dental composition dispensed from the composition reservoir 12. Tray reservoir 18 is sized, shaped, and/or otherwise configured to receive a dental composition dispensed from the composition reservoir, as well as the user's teeth and/or gums when the tray is applied. Exactly where in the tray the tray reservoir is located varied, depending on which portion of teeth and/or gums the dental composition is to be applied. Accordingly, tray 14 may be configured to be one-size-fits-all, or may be customized to fit a specific user's teeth and mouth. The tray may be rigid or may be flexible to accommodate the user's teeth. The tray may also comprise rigid portions and flexible portions. The components may be made from injection molded extruded, or blow molded thermoplastics, among other materials. The device may be assembled using snap-fit and press-fit interconnections or rivets, screws, and/or swaging, among other types of permanent, semi-permanent, or releasable connections.

The dispensing system comprises a dispensing mechanism 16 configured to cause the dental composition to dispense from composition reservoir 12 located at a distal end of the dispensing mechanism into tray reservoir 18 in the tray, which is located at a proximal end of the dispensing mechanism. The dispensing mechanism may take many different forms. According to an embodiment, dispensing mechanism 16 comprises a rotary drive mechanism 20 with a gear configured to interact with a guide rail 22 of the dental tray 14, comprising a plurality of cogs, notches, or teeth 23. The cogs may be pointed, rounded, or form any other shape, particularly to provide comfort to the user when the tray is inserted into the mouth.

As the dispensing mechanism 16 moves along the guide rail 22 located at the distal end of the dental tray, the plurality of cogs or teeth on the guide rail force the gear of rotary drive mechanism 20 to turn. As the gear turns, the rotary drive mechanism pulls the dental composition from, or pushes the dental composition out of, composition reservoir 12 into tray reservoir 18. The force applied by the user during the movement causes rotary motion in the drive mechanism. According to an embodiment, the rotary drive mechanism comprises a nozzle 24 through which the dental composition is dispensed into the tray reservoir 18. The nozzle 24 and tray reservoir 18 are positioned such that the position of the nozzle precisely follows a desired dispense path along the dental tray and thus the tray reservoir.

According to an embodiment, rotary drive mechanism 20 may be automated. For example, the mechanism may comprise a motor that causes the rotary drive to move along the guide rail and turn the gear to cause the dental composition to be dispensed.

Figure 2:
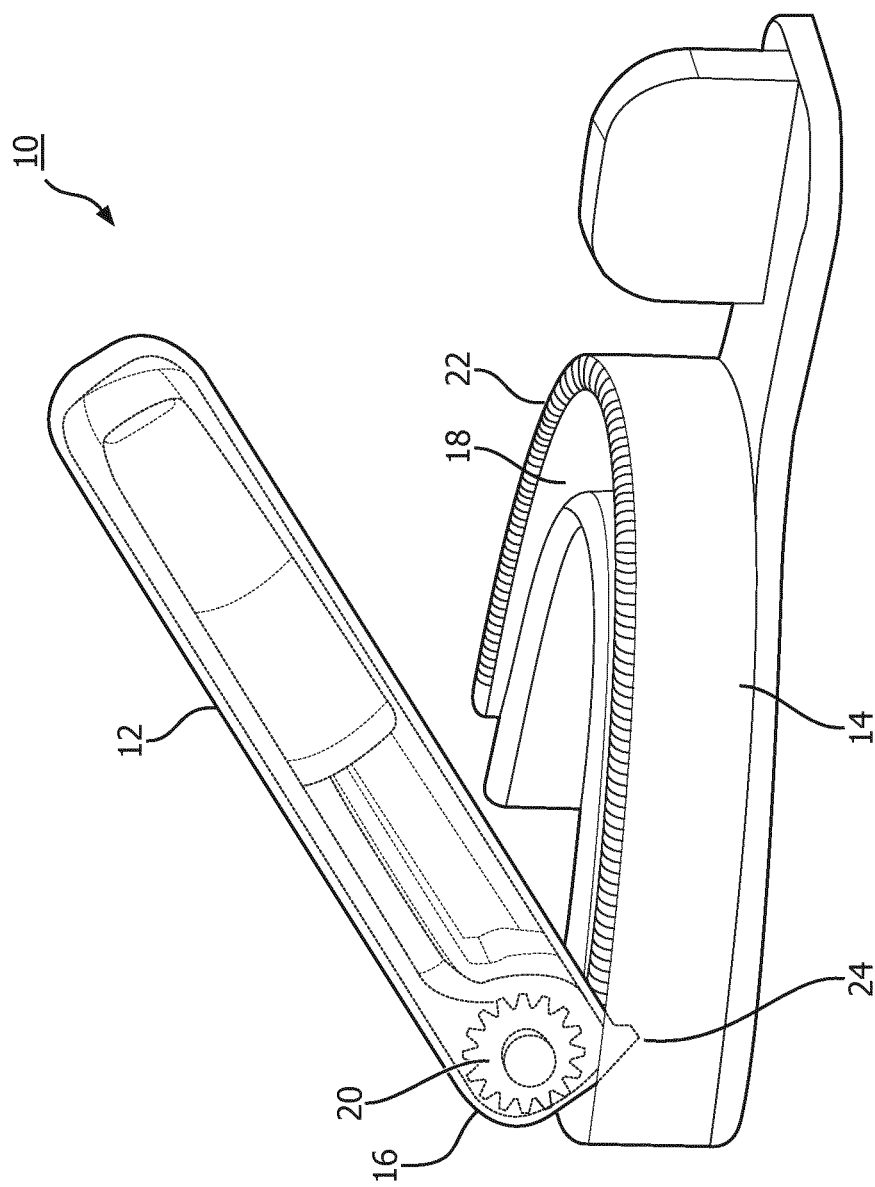
FIG. 2 is a schematic representation of a dental composition dispensing system, in accordance with an embodiment.

Referring to FIG. 2 is an embodiment of a dispensing system 10 configured to dispense a dental composition. The dispensing system comprises a composition reservoir 12 with a dispensing mechanism 16, and a tray 14. The composition reservoir 12 is positioned at an angle relative to the nozzle 24, and comprises a peristaltic-type positive displacement pump. As the user moves the composition reservoir 12 and the dispensing mechanism 16 along the guide rail 22 of the tray, or as a motor drives the dispensing mechanism along the guide rail, the plurality of teeth or cogs on the guide rail 22 interact with the gear of the rotary drive mechanism 20 and forces the dental composition stored within composition reservoir 12 to dispense into the tray reservoir.

Figure 3:
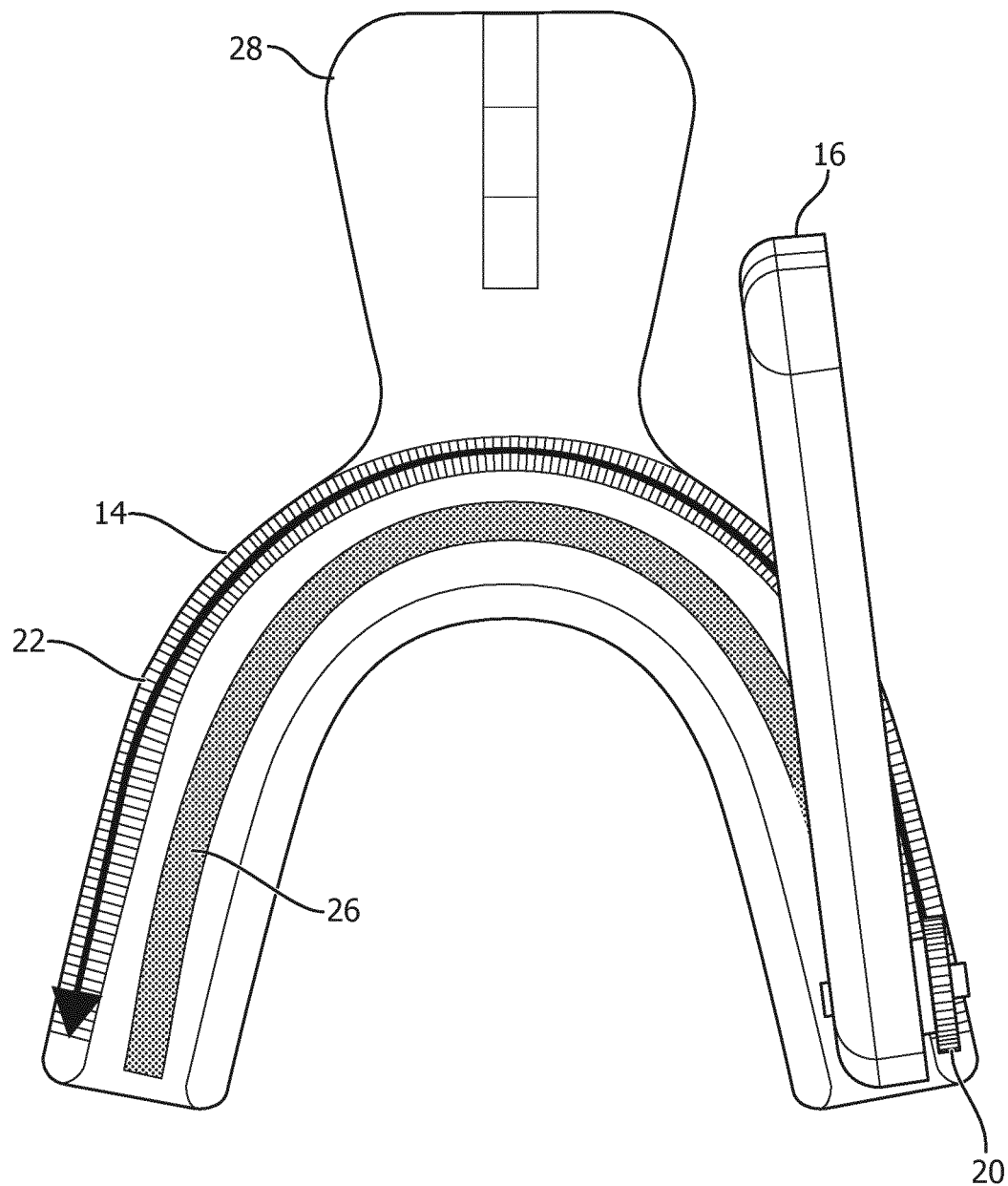
FIG. 3 is a schematic representation of a dental composition dispensing system, in accordance with an embodiment.

Referring to FIG. 3 is a top view of the dispensing system 10 of FIG. 2. The dispensing system comprises a dispensing mechanism 16 and a tray 14. The dispensing mechanism 16 comprises a peristaltic-type positive displacement pump. As the user moves the dispensing mechanism 16 along the guide rail 22 of the tray by means of the rotary drive mechanism 20, or as a motor drives the drive mechanism along the guide rail, the plurality of teeth or cogs on the guide rail 22 interact with the gear of the rotary drive mechanism 20 and forces the dental composition, shown as 26 in FIG. 3, stored within composition reservoir in the dispensing mechanism 16 to dispense into the tray reservoir. The arrow shows the direction that the dispensing mechanism 16 takes along the tray as it interacts with the guide rail of the tray.

According to an embodiment, tray 14 may comprise a handle 28 or other component or element necessary to perform one or more functions of the tray. For example, the user may utilize the handle to hold the tray during use of the dispensing mechanism, or to position the tray within the mouth when the tray reservoir has been filled. Many other components and elements are possible.

Figure 4:
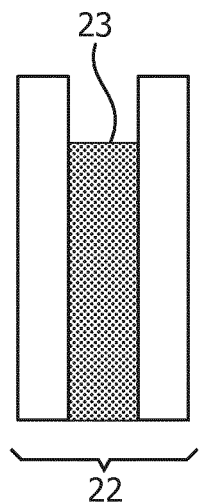
FIG. 4 is a schematic representation of a guide rail of a dental composition dispensing system, in accordance with an embodiment.

The plurality of teeth or cogs on guide rail 22 may comprise many different sizes, shapes, and configurations. Referring to FIG. 4 is an embodiment of guide rail 22 with a plurality of teeth 23. The plurality of teeth 23 are recessed within two walls of the guide rail 22, which may provide additional to comfort to the user. Similarly, the recessed teeth may provide improved guidance of the dispensing mechanism 16 along the guide rail 22. The gear or other component of rotary drive mechanism 20 must be configured to interact with the plurality of teeth within the recessed portion of the guide rail.

Figure 5:
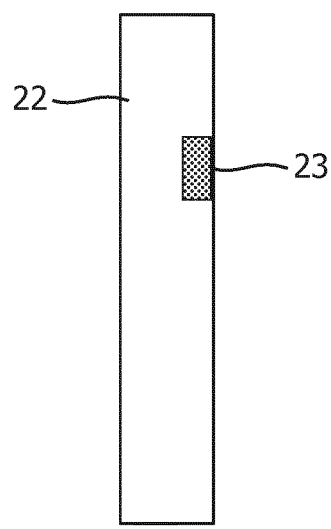
FIG. 5 is a schematic representation of a guide rail of a dental composition dispensing system, in accordance with an embodiment.

Referring to FIG. 5 is another embodiment of guide rail 22 with a plurality of notches 23. According to an embodiment, these notches are positioned within an outer wall of the guide rail, opposite the tray reservoir 18, to provide comfort to the user, although other configurations are possible. The gear or other component of rotary drive mechanism 20 must be configured to interact with the plurality of notches in the wall of the guide rail. In addition to these embodiments, many other embodiments of guide rail 22 are possible.

Figure 6:
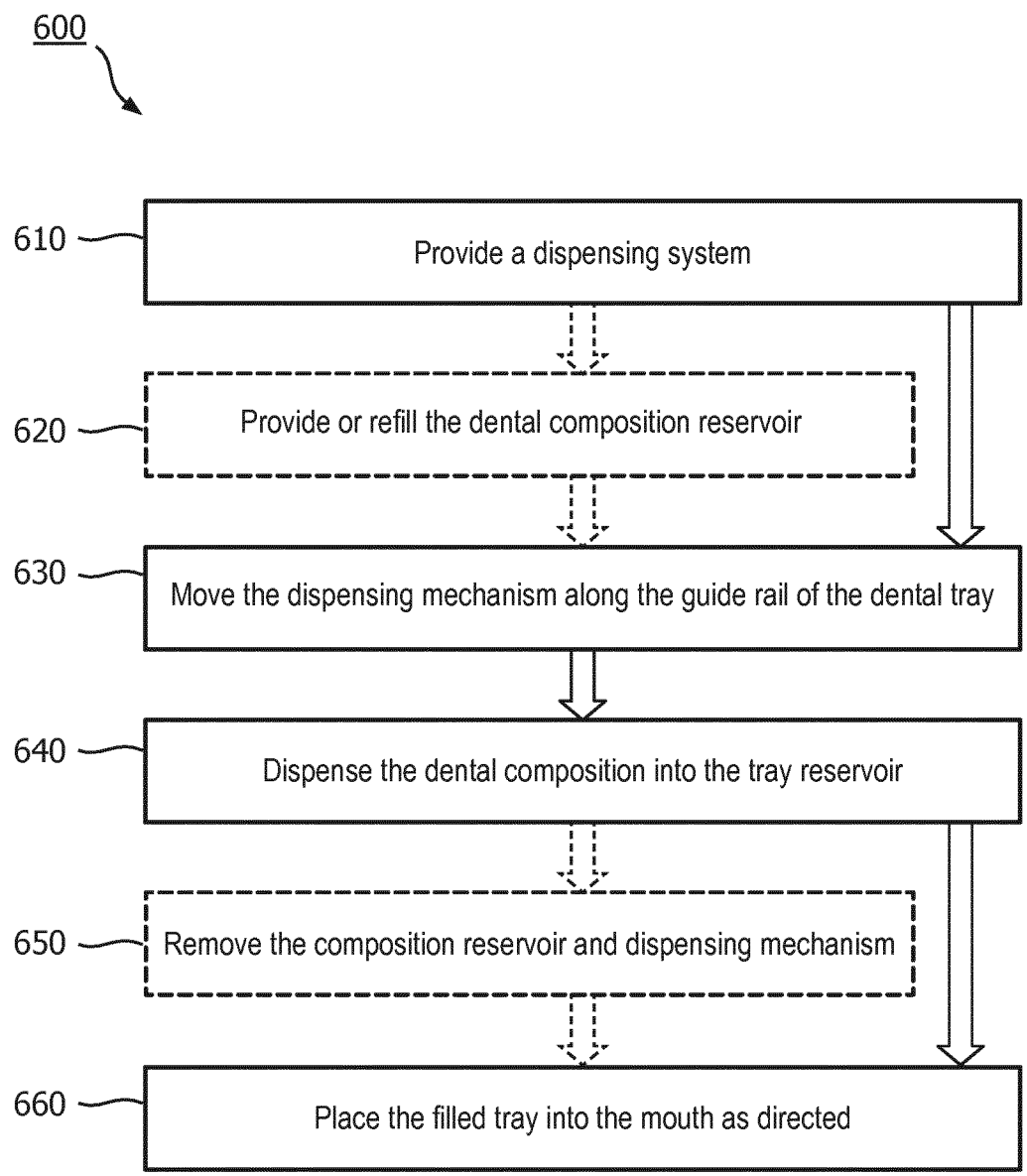
FIG. 6 is a flowchart of a method for dispensing a dental composition, in accordance with an embodiment.

Referring to FIG. 6 is a method 600 for dispensing a dental composition into a dental tray 14. A step 610, a dispensing system 10 is provided. The dispensing system 10 is any of the dispensing systems described or otherwise envisioned herein. For example, the dispensing system may be the dispensing systems described in conjunction with FIGS. 1-3, and may comprise a dental composition reservoir 12 with a dispensing mechanism 16, and a tray 14 with a tray reservoir 18. The composition stored in the composition reservoir can be any dental composition, such as one intended to be applied to the teeth and/or gums.

At optional step 620 of the method, a new dental composition reservoir 12 is provided, or an emptied dental composition reservoir is refilled. According to an embodiment, dispensing system 10 is disposable, and thus is intended for a single use or for multiple uses until composition reservoir 12 is depleted. However, according to another embodiment, dispensing system 10 is reusable and composition reservoir 12 is replaceable and/or refillable. Accordingly, the user may remove an empty reservoir 12 to replace it with a full reservoir, or to refill the empty reservoir. The reservoir may snap into and out of dispensing mechanism 16, or may otherwise be connected to the system. For a refillable reservoir, the user may refill the reservoir with the dental composition without having to remove the reservoir from the system. Alternatively, the user may remove the reservoir, refill it, and then place the reservoir back into the system.

At step 630 of the method, the dispensing mechanism 16 moves along the guide rail of the dental tray. Movement may be supplied manually by the user, or may be automated. As a user moves dispensing mechanism 16 along the guide rail of the dental tray, the plurality of teeth or notches on or in the guide rail 22 force the gear of rotary drive mechanism 20 to turn. According to an embodiment, rotary drive mechanism 20 may be automated. For example, the mechanism may comprise a motor that causes the rotary drive to move along the guide rail and turn the gear to cause the dental composition to be dispensed. Accordingly, at step 630 of the method the user may actuate the motor to cause the dispensing mechanism 16 to move along the guide rail of the dental tray.

At step 640 of the method, the dental composition is dispensed into the tray reservoir 18. According to an embodiment, as the dispensing mechanism along the guide rail of the dental tray, the plurality of teeth or notches on or in the guide rail force the gear of rotary drive mechanism 20 to turn. As the gear turns, the rotary drive mechanism pulls the dental composition from, or pushes the dental composition out of, composition reservoir 12 into tray reservoir 18. According to an embodiment, the rotary drive mechanism comprises a nozzle 24 through which the dental composition 26 is dispensed into the tray reservoir 18. The nozzle 24 and tray reservoir 18 are positioned such that the position of the nozzle precisely follows a desired dispense path along the dental tray and thus the tray reservoir.

At optional step 650, once the dispensing mechanism has moved along the entirety of, or a desired portion of, the guide rail, the user may remove the composition reservoir and the dispensing mechanism. This may enable review of the dental composition in the tray, comfort or fitting of the device in the user's mouth, and other functions.

At step 660 of the method, the user places the filled tray into the mouth, usually aligning the tray reservoir with the teeth and then applying a force to push the tray over the teeth such that the teeth are pushed into the dental composition, which is evenly distributed in the tray reservoir 18. This allows the dental composition to cover the teeth and/or gums where it can have the desired effect. After use, such as after a predetermined amount of time, the user may remove the tray and the dental composition.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of" and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A dispensing system configured to dispense a dental composition, the dispensing system comprising:
    a dental tray comprising a tray reservoir, and further comprising a guide rail;
    a dental composition reservoir configured to contain at least one dental composition; and
    a dispensing mechanism having a rotary drive with a gear in communication with the guide rail and configured to expel the at least one dental composition from the dental composition reservoir in response to the rotary drive moving the dispensing mechanism along the guide rail, the dispensing mechanism comprising a nozzle configured to direct the dispensed dental composition into the tray reservoir.

2. The dispensing system of claim 1, wherein the guide rail comprises a plurality of teeth configured to guide the gear of the rotary drive along the guide rail.

3. The dispensing system of claim 2, wherein at least some of the plurality of teeth are recessed within the guide rail.

4. The dispensing system of claim 1, wherein the guide rail comprises a plurality of notches configured to guide the rotary drive along the guide rail.

5. The dispensing system of claim 1, wherein the dental composition reservoir is configured to be refillable with the at least one dental composition.

6. The dispensing system of claim 1, wherein the dental composition reservoir is configured to be replaceable when the dental composition reservoir is empty.

7. The dispensing system of claim 1, wherein the dispensing mechanism comprises a positive displacement pump.

8. The dispensing system of claim 7, wherein the positive displacement pump is a screw pump or a rotary pump.

9. A dispensing device configured to dispense at least one dental composition, the dispensing device comprising:
    a dental tray comprising a tray reservoir configured to receive the at least one dental composition, and further comprising a guide rail comprising a plurality of teeth, cogs, or notches;
    a dental composition reservoir configured to contain the at least one dental composition; and
    a dispensing mechanism comprising a displacement pump, a nozzle, and further comprising a rotary drive having a gear, the rotary drive configured to interact with the plurality of teeth, cogs, or notches of the guide rail, wherein turning of the gear as the dispensing system moves along the guide rail causes the displacement pump to expel the at least one dental composition from the dental composition reservoir, from nozzle into the tray reservoir.

10. The dispensing device of claim 9, wherein at least some of the plurality of teeth, cogs, or notches are rounded.

11. The dispensing device of claim 9, wherein at least some of the plurality of teeth, cogs, or notches are recessed within the guide rail.

12. The dispensing device of claim 9, wherein the dental composition reservoir is configured to be refillable with the at least one dental composition.

13. The dispensing device of claim 9, wherein the dental composition reservoir is configured to be replaceable when the dental composition reservoir is empty.

14. The dispensing device of claim 9, wherein the displacement pump is a peristaltic-type positive displacement pump.

15. A method of uniformly dispensing a dental composition from a dispensing system having a dispensing mechanism into a dental tray, the method comprising:
providing the dispensing system configured to dispense the dental composition;
inserting a dental composition reservoir configured to contain the dental composition into a distal end of the dispensing mechanism;
moving, by means of a rotary drive on the dispensing mechanism, the dispensing mechanism along a guide rail having a plurality of teeth at a distal end of the dental tray; and
dispensing the dental composition from the dental composition reservoir through a nozzle at a proximal end of the dispensing mechanism configured to dispense the dental composition into a tray reservoir in the dental tray.

* * * * *